United States Patent [19]
Barnard

[11] 3,742,967
[45] July 3, 1973

[54] SENSING ARRANGEMENT FOR A FLUIDIC LIQUID LEVEL SENSOR AND CONTROL MEANS

[75] Inventor: Daniel D. Barnard, Birmingham, Mich.

[73] Assignee: The Bendix Corporation, Southfield, Mich.

[22] Filed: Dec. 21, 1970

[21] Appl. No.: 99,805

[52] U.S. Cl. ............................................. 137/819
[51] Int. Cl. .......................................... F15c 1/12
[58] Field of Search..................... 137/81.5; 235/201

[56] References Cited
UNITED STATES PATENTS

| | | | |
|---|---|---|---|
| 3,277,914 | 10/1966 | Manion............................ | 137/81.5 |
| 3,232,095 | 2/1966 | Symnoski et al............... | 137/81.5 X |
| 3,267,949 | 8/1966 | Adams............................. | 137/81.5 |
| 3,331,380 | 7/1967 | Schonfeld et al.............. | 137/81.5 |
| 3,463,178 | 8/1969 | Kirchmier...................... | 137/81.5 |
| 3,467,122 | 9/1969 | Jones............................... | 137/81.5 |
| 3,542,050 | 11/1970 | Sowers........................... | 137/81.5 |
| 3,498,307 | 3/1970 | Adams............................. | 137/81.5 |
| 3,603,336 | 9/1971 | Fichter............................ | 137/81.5 |

Primary Examiner—Samuel Scott
Attorney—John R. Benefiel and Plante, Hartz, Smith & Thompson

[57] ABSTRACT

A fluidic liquid level sensor and control means utilizing "off the shelf" fluidic jet amplifiers as the sensing and control means. This arrangement includes a sensing tube disposed at a selected level in the volume the level of which is to be controlled, with the sensing tube connected to a control port of a sensing jet amplifier having an opposing control port vented in order that the formation of low pressure regions and any resulting wall attachment effects are prevented from occurring, causing the power jet to split equally between two output legs. When the sensing tube outlet is restricted by the liquid in the controlled volume, the low pressure region can occur which causes the power jet to exit entirely from one leg since it attaches to the wall nearest thereto. A monostable actuation jet amplifier with opposing control ports connected to a respective output leg of the sensing jet amplifier is provided so that when flow is split in the sensing amplifier the actuation amplifier assumes its monostable output, but when the output flow of the sensing amplifier is in a single leg, it is switched to its astable output. The output of the actuation amplifier is disclosed as operating flow control means to thereby control the level of liquid in the volume.

8 Claims, 1 Drawing Figure

PATENTED JUL 3 1973
3,742,967
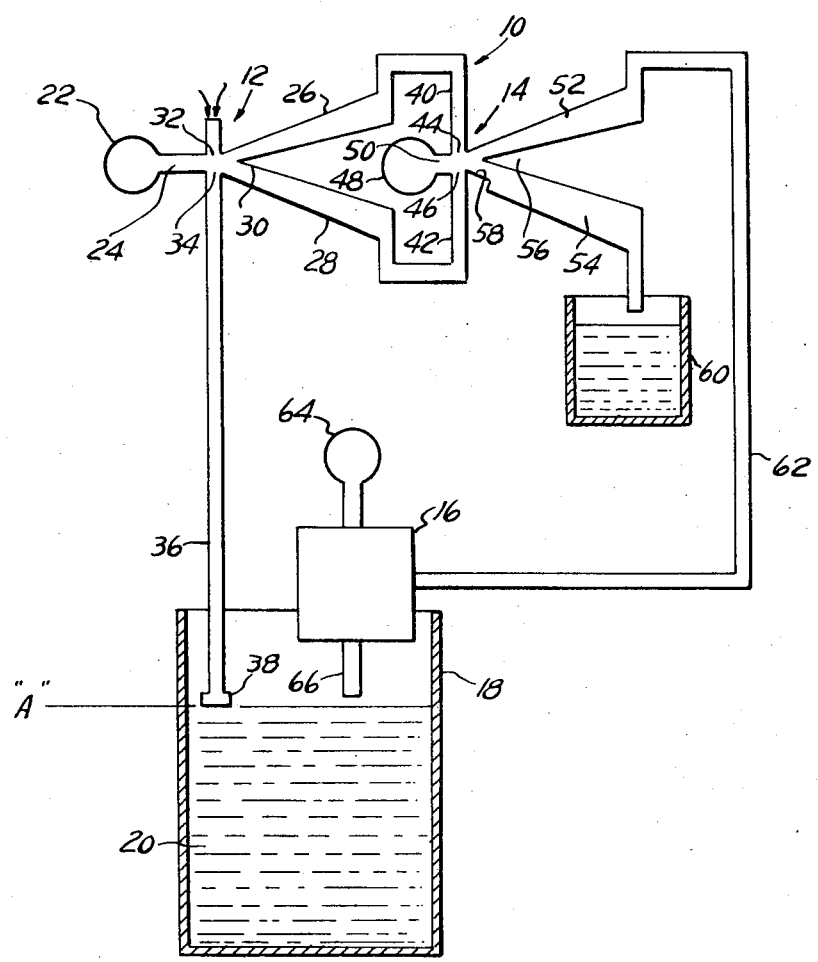
INVENTOR
DANIEL D. BARNARD
BY John R Benefiel
ATTORNEY

3,742,967

SENSING ARRANGEMENT FOR A FLUIDIC LIQUID LEVEL SENSOR AND CONTROL MEANS

BACKGROUND OF THE INVENTION

1. Field of the Invention

This invention concerns fluidics and specifically the application of fluidic amplifiers to liquid level sensing and control means.

2. Description of the Prior Art

The use of fluidic jet amplifiers as liquid level sensing and control devices has been proposed and described heretofore in numerous patents, as for example in U.S. Pat. Nos. 3,267,949, 3,277,914, 3,392,741, and 3,404,700. All of these patents use a sensing tube which is restricted by the rise of liquid in a tank to a predetermined level. Since the sensing tube is connected to a control port, its restriction is utilized in these patents as a pressure signal to switch the jet amplifier from one output to another by allowing wall attachment to occur and thereby provide sensing and control of the liquid level. However, since the pressure "signal" is in a sense, negative, i.e., the restriction of the line prevents aspiration of air into the control port reducing the pressure thereat and allowing wall attachment of the power jet to the port side wall, a special amplifier design is required by these approaches. This is because the wall attachment created by restriction of the sensing line must overcome whatever pressure differential is creating stable flow in the opposite leg, i.e., a lesser wall attachment effect, a positive pressure signal, or as in the system described in U.S. Pat. No. 3,277,914, asymmetrical flow of the power jet or some other phenomenon. Thus a special design which may be somewhat subject to critical dimensions, operating conditions, etc., is required which, therefore, may also be subject to unreliable operation.

Hence, it is an object of the present invention to provide a fluidic jet amplifier arrangement for sensing restriction of a control port line as by liquid in a control volume and providing a sharp, reliable output signal in response thereto without requiring an amplifier especially configured for such use or the use of other special devices.

SUMMARY OF THE INVENTION

This object and others which will become apparent upon a reading of the following specification and claims is accomplished by combining a first jet amplifier with vented control ports with a second monostable jet amplifier by connecting the output legs of the first amplifier to the second amplifier control ports. When one of the vented control ports is restricted, the first amplifier switches to monostable operation from a condition in which flow splits between the two outlet legs. This occurrence is arranged to cause a shift from the second amplifier's monostable output to its astable output, which shift is utilized as the output signal indicating restriction of the control port. This arrangement is utilized as a liquid level sensing and control means by positioning a sensing line connected to the control port at the level to be controlled in a volume and connecting flow control means to the second jet amplifier.

BRIEF DESCRIPTION OF THE DRAWING

The FIGURE is a schematic representation of the sensing and control circuit according to the present invention.

DETAILED DESCRIPTION OF THE PREFERRED EMBODIMENT

In the following detailed description, certain specific terminology will be utilized for the sake of clarity and a specific embodiment described in order to provide a complete understanding of the invention, but the invention is not so limited and may be practiced in a variety of forms and embodiments.

Referring to the drawing, the sensing and control circuit 10 is depicted schematically, which consists of a sensing jet amplifier 12 and an actuation jet amplifier 14 operatively associated with a flow control device 16 and a tank 18 defining a controlled volume of liquid 20 such as fuel in a fuel tank.

The sensing amplifier 12 is a conventional jet amplifier having a fluid pressure source 22 with a power jet channel 24 directing the flow from the source 22 at a pair of output legs 26 and 28 defined in part by a central splitter body 30 in the conventional manner.

A pair of control ports 32 and 34 are also provided in the usual manner extending at an angle to the power jet channel 24.

Control port 32 is vented so that the power jet will aspirate air whenever the device is operating, while control port 34 is connected to a sensing line 36 extending into the tank 18 and having an outlet 38 positioned at level "A" indicated on the figure. Hence, control port 34 will also allow aspiration of air by the power jet whenever the liquid level is below level "A" in the tank 18.

The amplifier geometry is selected so that in the absence of a pressure differential across the control ports 32 and 34, flow will exist in substantially equal magnitude in each output leg 26 and 28, since the aspiration of air thereinto insures that the formation of low pressure regions is prevented and no wall attachment will occur with respect to either output leg 26 or 28. Such amplifiers are available commercially as standard or "off the shelf" items. Each output leg 26 and 28 of the sensing amplifier 12 is connected via lines 40 and 42 to a respective one of a pair of opposing control ports 44 and 46 of the actuation amplifier 14.

The actuation amplifier 14 also includes a fluid pressure source 48 and a power jet channel 50 in the conventional manner, the power jet directing flow at a pair of output legs 52 and 54 defined in part by a central splitter body 56.

In this case, the actuation amplifier geometry is selected so that it is monostable as to output leg 54, that is, in the absence of a pressure differential between control port 44 and 46 all of the flow from the power jet tends to exit from leg 54. This may be accomplished in a number of ways as by means of an attachment wall 58 positioned so that the power jet will attach thereinto in the manner well known in the art. Alternatively, port 44 could be made larger than port 46, an additional bias port could be utilized, or the splitter body 56 could be positioned asymmetrically with respect to the output legs 52 and 54 as disclosed in the Manion U.S. Pat. (No. 3,277,914) discussed infra in order to provide the monostable operation.

Output leg 54 is connected to direct fluid to a return or sump 60, while output leg 52 is connected via passage 62 to the flow control device 16 so as to control liquid flow from a source 64 to the tank 18 via line 60.

The control device 16 is arranged to cut off such flow whenever an output leg 52 is pressurized.

Since many such devices are known in the prior art such as that described in the Shinn U.S. Pat. (No. 3,392,741) referred to infra, or automatic cutoff triggers as used in conventional fueling nozzles, it is not felt necessary to describe the flow control device 16 in any detail.

Alternatively, the flow in line 62 could be arranged to direct flow directly into the tank 18 if the flow requirements of the particular system can be met by the circuit 10, as described in the Manion patent and the Adams U.S. Pat. (No. 3,267,949) also discussed infra.

OPERATION

Initially, with the liquid in the tank 18 below the level "A," both control ports 32 and 34 are aspirating air and flow from the power jet tends to split equally between output legs 26 and 28, hence providing substantially equal flows and pressures at the control ports 44 and 45 of the actuation amplifier. Since these flows and pressures are approximately equal, the actuation amplifier 14 assumes its mode of operation in which the power jet exits substantially entirely from the output leg 54 to the return or sump 60, thus allowing liquid from source 64 to pass into the tank 18.

When the liquid 20 attains level "A," the outlet 38 of the sensing tube 36 becomes restricted, preventing further aspiration of air into port 34, which allows a low pressure region and resulting wall attachment effect to develop with respect to the power jet and the channel wall next to the control port 34, causing the power jet to exit primarily from output leg 28.

This in turn creates a substantial pressure differential between the control ports 44 and 46 of the actuation amplifier 14 to cause switching of the power jet from output leg 54 to output leg 52. Thus, a pressure signal is sent via passage 62 to the flow control device 16 to discontinue flow to the tank 18.

In connection with this, load vents may be provided in the various output legs to provide for overflow to pass out of the circuit without causing excessive back-pressures or other malfunctions, in the manner now well known in the art.

From this description, it should be apparent that an arrangement has been provided whereby the restriction of a control port of a jet amplifier can produce positive output pressure in response thereto without the necessity of an especially designed and potentially unreliable jet amplifier. Furthermore, an advantageous liquid level sensing and control circuit utilizing this arrangement has also been provided.

While specific examples of the present invention have been described, many modifications and substitutions are of course possible within the scope of the appended claims.

In this connection, alternate methods of creating monostable operation of the actuation amplifier 14 or alternate flow control arrangements could be utilized as pointed out above.

What is claimed is:

1. An arrangement for sensing restriction of a sensing passage means comprising:
   a first jet amplifier having a power jet, at least one control port and a pair of output legs;
   means connecting the at least one of said control ports to said sensing passage means;
   means causing said power jet to split roughly equally between said output legs when said sensing passage means is unrestricted;
   means causing said power jet to exit substantially entirely from one of said output legs when said sensing passage is restricted;
   a second jet amplifier having a power jet, a pair of opposing control ports, and a pair of output legs;
   means connecting said output legs of said first jet amplifier to a respective control port of said second jet amplifier;
   means causing said power jet to exit substantially entirely from one of said output legs when said flow to said second jet amplifier control ports is roughly equal; and
   means causing said power jet to exit substantially entirely from the other of said second jet amplifier output outlets whenever flow from said first jet amplifier is substantially entirely to one of said control ports, whereby flow in said one of said output legs provides a signal indicating an unrestricted sensing passage means and flow in said other output leg indicates a restricted condition of said sensing passage means.

2. The arrangement of claim 1 wherein said means causing said first amplifier power jet to split between said output legs includes another control port opposite said one control port and further includes means venting said another control port to a high pressure region, whereby any wall attachment effects with respect to one of said output legs on said opposite side are substantially eliminated.

3. The arrangement of claim 1 wherein said means causing said second amplifier power jet to exit substantially entirely from one of said output legs includes means creating a wall attachment effect on said power jet directing it substantially entirely to said one of said output legs.

4. The arrangement of claim 1 wherein said means causing said second amplifier power jet to exit substantially entirely from one of said output legs includes means creating a wall attachment effect on said power jet directing it substantially entirely to said one of said output legs.

5. A liquid level sensing arrangement for sensing the attainment of a level of liquid in a volume comprising:
   a sensing passage means having an outlet positioned at said level in said volume;
   a first jet amplifier having a power jet, at least one control port and a pair of output legs;
   means connecting the other one of said control ports to said sensing passage means;
   means causing said power jet to split roughly equally between said output legs when said sensing passage means is unblocked;
   means causing said power jet to exit substantially entirely from one of said output legs when said sensing passage is restricted;
   a second jet amplifier having a power jet, a pair of opposing control ports, and a pair of output legs;
   means connecting said output legs of said first jet amplifier to a respective control port of said second jet amplifier;
   means causing said power jet to exit substantially entirely from one of said output legs when said flow to said second jet amplifier control ports is roughly equal; and means causing said power jet to exit substantially entirely from the other of said second jet amplifier output legs, whenever flow from said first jet amplifier is substantially entirely to one of said control ports, whereby flow in said one of said output legs provides a signal indicating an unrestricted sensing passage means and flow in said other output leg indicates a restricted condition of said sensing passage means.

6. The liquid level sensing arrangement of claim 4 wherein said means causing said first amplifier power jet to split between said output legs includes another control port opposite said one control port and further includes means venting said another control port to a high pressure region, whereby any wall attachment effects with respect to one of said outlet legs on said opposite side are substantially eliminated.

7. The liquid level sensing arrangement of claim 5 further including control means providing for liquid flow to said volume whenever said level of liquid in said volume and discontinuing flow to said volume upon attainment of said volume.

8. An arrangement for providing a pair of positive pressure outputs from a fluid jet amplifier which shifts from a condition in which output flow exits roughly equally from a pair of output legs to a condition in which flow exits substantially entirely from one of said output legs upon restriction of a control port comprising:
a monostable fluid jet amplifier including a pair of opposing control ports, and a pair of output legs;
means connecting a respective one of said output legs to a respective one of said control ports of said monostable fluid jet amplifier, with said output in which flow exits entirely therefrom upon restriction of said control port connected to the control port of said monostable jet amplifier tending to deflect flow away from said monostable outlet, whereby said output flow from said monostable jet amplifier exits entirely from its monostable outlet when flow exits equally from said first mentioned jet amplifier outputs and from the other output when said flow exits substantially entirely from said one output.

* * * * *